United States Patent
Reinwald et al.

(10) Patent No.: US 9,454,472 B2
(45) Date of Patent: *Sep. 27, 2016

(54) SPARSITY-DRIVEN MATRIX REPRESENTATION TO OPTIMIZE OPERATIONAL AND STORAGE EFFICIENCY

(71) Applicant: International Business Machines Corporation, Armonk, NY (US)

(72) Inventors: Berthold Reinwald, San Jose, CA (US); Shirish Tatikonda, San Jose, CA (US); Yuanyuan Tian, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,751

(22) Filed: Apr. 15, 2016

(65) Prior Publication Data

US 2016/0217066 A1 Jul. 28, 2016

Related U.S. Application Data

(63) Continuation of application No. 14/058,338, filed on Oct. 21, 2013.

(51) Int. Cl.
*G06F 12/02* (2006.01)
*G06F 17/16* (2006.01)

(52) U.S. Cl.
CPC .......... *G06F 12/0223* (2013.01); *G06F 17/16* (2013.01)

(58) Field of Classification Search
CPC ........................... G06F 12/0207; G06F 17/16
See application file for complete search history.

(56) References Cited

U.S. PATENT DOCUMENTS

| 5,267,185 A * | 11/1993 | Akabane ................. G06F 17/16 708/520 |
| 9,164,960 B2 | 10/2015 | Hatsutori et al. |
| 2007/0198621 A1 * | 8/2007 | Lumsdaine ............. G06F 17/16 708/200 |
| 2009/0282207 A1 * | 11/2009 | Burkart ............... G06F 12/0207 711/170 |
| 2011/0307685 A1 | 12/2011 | Song et al. |
| 2014/0108481 A1 * | 4/2014 | Davis ..................... G06F 17/16 708/607 |
| 2015/0067009 A1 | 3/2015 | Strauss et al. |

* cited by examiner

*Primary Examiner* — Chuong D Ngo
(74) *Attorney, Agent, or Firm* — Cantor Colburn LLP

(57) ABSTRACT

Embodiments of the invention relate to sparsity-driven matrix representation. In one embodiment, a sparsity of a matrix is determined and the sparsity is compared to a threshold. Computer memory is allocated to store the matrix in a first data structure format based on the sparsity being greater than the threshold. Computer memory is allocated to store the matrix in a second data structure format based on the sparsity not being greater than the threshold.

1 Claim, 6 Drawing Sheets

MATRIX A /202
(8 rows, 10 columns)

0 0 1 0 0 0 0 0 0
0 0 0 1 0 0 0 1 0 0
0 0 0 0 0 0 0 1 0 0
0 0 0 0 0 0 0 0 0 0
0 0 0 0 1 0 0 0 0 0
1 0 0 0 0 0 0 0 0 0
0 0 0 0 0 0 0 0 0 0
0 0 0 0 1 0 0 0 0 0

MATRIX C /206
(10 rows, 8 columns)

0 0 0 0 1 0 0 0
0 0 1 0 0 0 0 0
1 0 0 0 0 0 0 0
0 0 1 0 0 0 1 0
0 0 0 0 0 0 1 0
0 0 0 0 0 0 0 0
1 0 0 0 0 0 0 0
0 0 0 0 1 1 0 0
0 0 0 0 0 0 0 0
0 0 0 0 0 0 0 0

MATRIX B /204
(8 rows, 10 columns)

| Row 1 | Row 2 | Row 3 | Row 6 | Row 7 | Row 8 |
|---|---|---|---|---|---|
| 0 1 0 0 1 0 0 | 0 0 0 1 0 0 0 | 0 0 1 0 0 1 | 0 0 1 | 1 1 1 1 0 0 0 0 | 0 1 1 1 1 0 0 0 0 |

SPARSITY-DRIVEN MATRIX REPRESENTATION TO OPTIMIZE OPERATIONAL AND STORAGE EFFICIENCY

DOMESTIC PRIORITY

This application is a continuation of U.S. patent application Ser. No. 14/058,338, filed Oct. 21, 2013, the content of which is incorporated by reference herein in its entirety.

BACKGROUND

The present invention relates generally to storing matrices in computer memory, and more specifically, to sparsity-driven selection of data structures for storing matrices in computer memory.

Matrices and linear algebra operations are the building blocks for a broad class of supervised and unsupervised machine learning algorithms. Machine learning algorithms that use such operations include non-negative matrix factorization (NMF), single value decomposition (SVD), linear regression, logistic regression, hypertext induced topic selection (HITS), and support vector machines (SVMs).

A sparse matrix is a matrix that is populated primarily with zeros. By contrast, if a larger number of elements differ from zero, then it is common to refer to the matrix as a dense matrix. The fraction of non-zero elements to all elements in a matrix is called the sparsity or density of the matrix.

There are a variety of matrix representations in use today such as: compressed sparse row (CSR) which includes three fixed length arrays; compressed sparse column (CSC) which is similar to CSR but for columns; list of lists (LIL) which stores one list per row, where each entry stores a column index and value; and dictionary of keys (DOK) which represents non-zero values as a dictionary mapping.

The data structures used to store matrices or blocks of matrices have an impact on both the performance and memory footprint associated with linear algebra operations.

BRIEF SUMMARY

Embodiments of the invention include a system, computer program, and method for sparsity-driven matrix representation. In one embodiment, a sparsity of a matrix is determined and the sparsity is compared to a threshold. Computer memory is allocated to store the matrix in a first data structure format based on the sparsity being greater than the threshold. Computer memory is allocated to store the matrix in a second data structure format based on the sparsity not being greater than the threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 2 illustrates example matrices in accordance with an embodiment;

FIG. 3 illustrates a data structure for storing a dense matrix in accordance with an embodiment;

DETAILED DESCRIPTION

Exemplary embodiments are directed to selecting data structures for storing matrices in computer memory. The data structure for a particular matrix is selected based on a measurement of the sparsity of the matrix. In an embodiment, if the matrix has a relatively large number of non-zero entries then it may be determined to be a dense matrix, and a first type of data structure may be used to store the matrix. If the matrix has a relatively small number of non-zero entries, then it may be determined to be a sparse matrix, and a second type of data structure may be used to store the matrix. The ability to select between different data structures for storing a matrix based on its content allows for flexibility in balancing the costs of storing, modifying, and operating on matrices when performing, for example, matrix based linear algebra operations.

Exemplary embodiments keep track of the sparsity of a matrix and modify the storage format of the matrix based on changes to the sparsity in order to balance memory footprint and performance requirements. In addition, embodiments may dynamically estimate the sparsity of result matrices for linear algebra operations based on the sparsity of the input matrices and the type of operation being performed. The estimated sparsity may be used to choose the right format for storing the result matrix and may further serve as the basis for the space allocation policy for constructing the result matrix.

Figure 1:
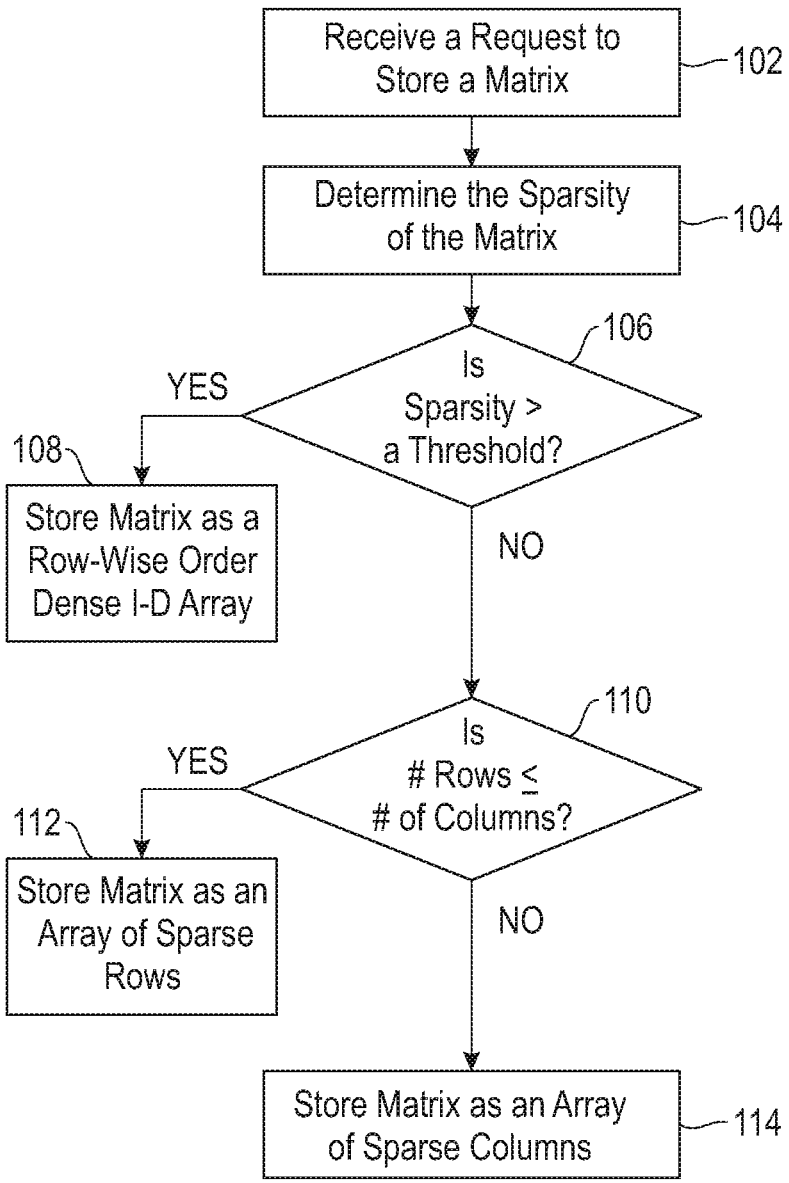
FIG. 1 illustrates a flow diagram of a method for performing sparsity-driven selection of data structures for storing matrices in computer memory in accordance with an embodiment.

Turning now to FIG. 1, a flow diagram of a method for performing sparsity-driven selection of data structures for storing matrices in computer memory is generally shown in accordance with an embodiment. At block 102, a request to store a matrix is received, and at block 104 the sparsity of the matrix is determined. As used herein, the term "sparsity" refers to a measurement (expressed, for example, as a percentage or as a raw number) of the number of non-zero values in a matrix. The sparsity of the matrix may be denoted "SP(matrix identifier)."

At block 104, the sparsity may be determined for an existing matrix X, having "Xm" rows, "Xn" columns, and "Xnnzs" non-zero values. In this case, SP(X) may be calculated as: SP(X)=Xnnzs/Xm/Xn. Referring to FIG. 2, sparsities of matrices A, B, and C may be calculated as: SP(A)=7/8/10=0.0875; the SP(B)=32/8/10=0.4; and the SP(C)=9/10/8=0.1125.

Referring back to FIG. 1, at block 104, the sparsity may be determined for a result matrix that is not yet populated and the determining includes estimating the sparsity of the result matrix. The estimating may be based on the estimated sparsity of the input matrices and the type of operation being performed. For example, for matrices X and Y, assume that SP(X)="p", SP(Y)="q", that there is a uniform distribution of non-zero values inside each matrix, and that all non-zero values are non-negative. When the contents of two matrices are cell-wise multiplied, ANDed (e.g., a logical AND operation is performed), added, and/or ORed (e.g., a logical OR operation is performed), it may be assumed that the two matrices (as well as the result matrix) have the same number of rows and the same number of columns. Thus, it is assumed that Xm=Ym and Xn=Yn. When calculating the product of two matrices X and Y (also referred to as multiplying matrix X by matrix Y or matrix multiplication), it may be assumed that Xn=Ym and that the number of rows in the result matrix is Xm and that the number of columns in the result matrix is Yn.

In an embodiment, the sparsity estimate of a result matrix for storing the result when the contents of matrices X and Y are cell-wise multiplied, SP(X*Y), or ANDed, SP(X&Y), may be calculated, at block 104, as the SP(X)*SP(Y) which is equal to p*q (where "*" is the symbol for multiply). In an embodiment, the sparsity estimate of a result matrix for storing the result when the contents of matrices X and Y are added, SP(X+Y), or ORed, SP(X|Y), may be calculated as(1−(1−SP(X))*(1−SP(Y)) which is equal to (1−(1−p)*(1−q)). In an embodiment, the sparsity estimate of a result matrix for storing the result when the contents of a matrix are transposed, SP(t(X)), is the same as the sparsity of the original matrix X. In an embodiment, a sparsity estimate of a result matrix for storing the result when matrix X is multiplied by matrix Y, SP(X %*% Y) may be calculated as $(1-(1-p*q)^k)$. In this example, of matrix multiplication, matrix X has Xm rows and Xn columns and matrix Y has Ym rows and Yn columns, and k is the value of Xn which is the same as Ym.

Referring to the matrices shown in FIG. 2 as examples, an estimate of the sparsity of the result matrix when the contents of matrices A and B are cell-wise multiplied or ANDed together may be calculated as: SP(A*B)=SP (A&B)=SP(A)*SP(B)=(0.0875)*(0.4)=0.35. An estimate of the sparsity of a result matrix when the contents of matrices A and B are added or ORed together may be calculated as: SP(A+B)=SP(A|B)=1−(1−SP(A))*(1−SP(B))=1−((1−.0875)*(1−.4))=1−((0.9125)*(0.6))=1−.5475=0.4525. An estimate of the sparsity of the result matrix when the contents of matrix A are transposed is SP(t(A))=0.0875. An estimate of the sparsity of a result matrix when matrix B is multiplied by matrix C may be calculated as: SP(B %*% C)=$(1-(1-SP(B)*SP(C))^k)$=$(1-(1-0.4*0.1125)^{10})$=$(1-0.955^{10})$=(1−.631)=0.369.

Referring back to FIG. 1, at block 106, the sparsity determined at block 104 is compared to a threshold. The threshold may be programmable and may vary based on factors such, but not limited to: available memory, and performance requirements of a computer program using the matrix. The threshold may be set to a number between one and zero. If the sparsity determined at block 104 is greater than the threshold, then block 108 is performed and the matrix may be treated as a dense matrix. The matrix may be stored in a data structure that supports a dense matrix, such as, but not limited to: a one-dimensional (1D) array (see FIG. 3 for an example 1D array data structure) that follows a row-wise order, a 1D array that follows column-wise order, or a two-dimensional (2D) array. This data structure stores the matrix in a format that allows for quick access to each entry in the matrix. Block 108 may include two distinct processes, first the allocation of the memory space for a dense matrix, and second the storing of the contents of the matrix in the allocated memory space.

If the sparsity determined at block 104 is not greater than the threshold, then block 110 is performed and the matrix may be treated as a sparse matrix. At block 110 it is determined whether the number of rows in the matrix is less than or equal to the number of columns. Block 112 is performed if the number of rows in the matrix is less than or equal to the number of columns. At block 112, the matrix may be stored in a data structure that supports a sparse matrix, such as an array of sparse rows (see FIGS. 4 and 5 for examples of an array of sparse rows data structure). This data structure stores the matrix in a format that may conserve memory space because it stores only non-zero matrix entries. Block 112 may include two distinct processes, first the allocation of the memory space for a sparse matrix, and second the storing of the contents of the matrix in the allocated memory space.

If it is determined at block 110, that the number of columns in the array is greater than the number of rows, then block 114 is performed to store the sparse matrix in a data structure that supports a sparse matrix having more columns than rows, such as an array of sparse columns. This data structure stores the matrix in a format that may conserve memory space because it stores only non-zero matrix entries. Block 114 may include two distinct processes, first the allocation of the memory space for a sparse matrix, and second the storing of the contents of the matrix in the allocated memory space.

Referring now to FIG. 3, a 1D array data structure 300 for storing a dense array is generally shown in accordance with an embodiment. FIG. 3 shows matrix A 202 from FIG. 2 stored in a 1D array data structure 300. The 1D array data structure 300 includes entries for each entry in matrix A 202 starting with the entries in all of the columns in the first row, labeled Row 1 302, through the entries in all of the columns in the last row, labeled Row 8 302.

Figure 4:
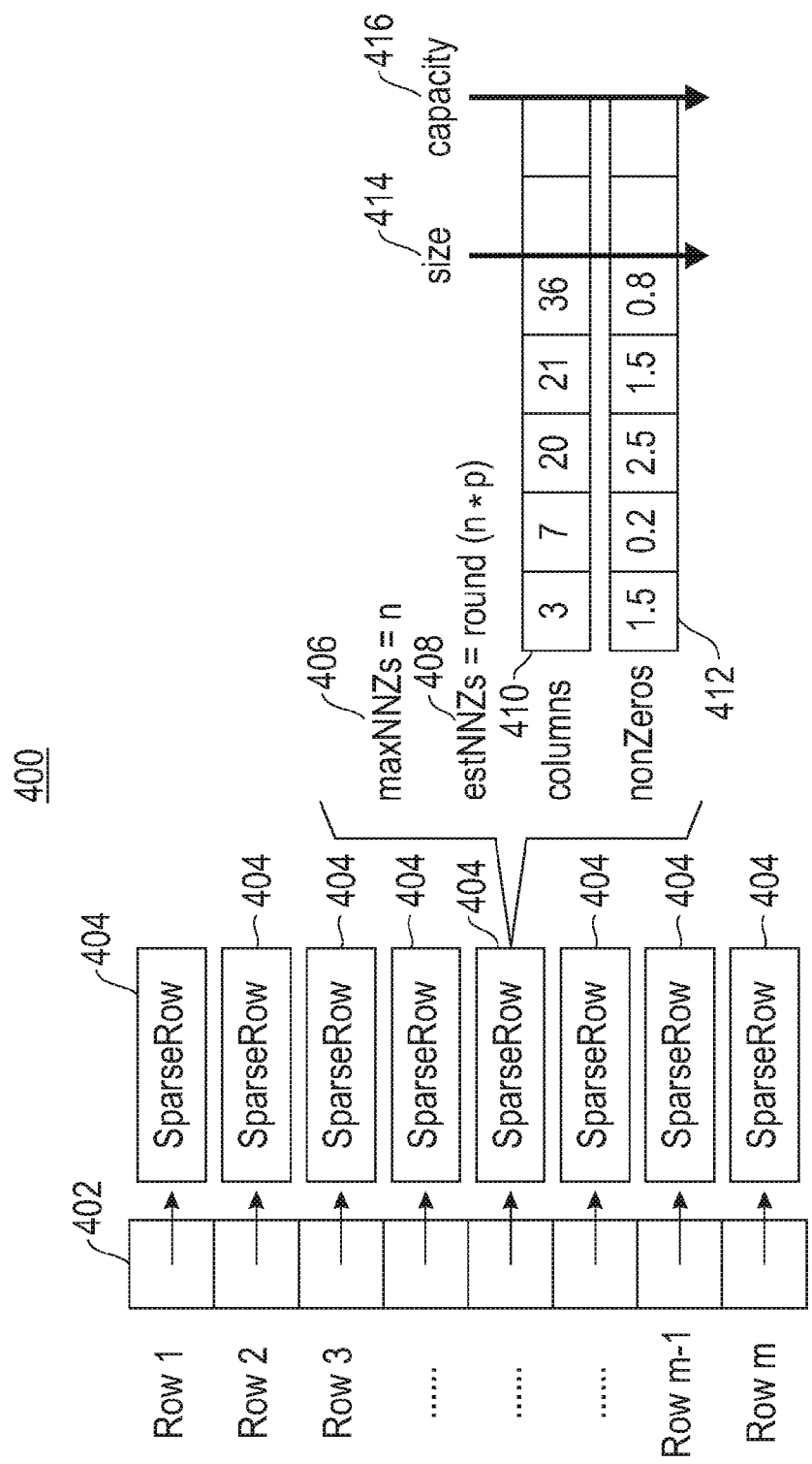
FIG. 4 illustrates a data structure for storing a sparse matrix in accordance with an embodiment.

Turning now to FIG. 4, an array of sparse rows data structure 400 is generally shown in accordance with an embodiment. The array of sparse rows data structure 400 includes an array 402 that includes an entry for each row in a matrix and a resizable sparse row memory location 404 for each of the rows in the matrix. Entries in the array 402 include pointers to the sparse row memory locations 404. Each sparse row memory location 404 may include a maximum number of non-zeros (maxNNZs) 406, an estimated number of non-zeros (estNNZs) 408, a columns array 410, a nonZeros array 412, a size value 414, and a capacity value 416.

The maxNNZs 406 may be set equal to the number of columns in the matrix, or n. The estNNZs 408 may be set equal to the number of columns in the matrix times the sparsity of the matrix rounded up to the nearest integer, or round(n*p). estNNZs 408 is programmable and may be set to other values, such as round(2*n*p), or to a selected integer value. The columns array 410 may be a resizable array storing the ordered column indices of columns having non-zero entries, and the nonZeros array 412 may be a resizable array storing the non-zero values. As shown in FIG. 4, columns 3, 7, 20, 21, and 36 contain non-zero entries 1.5, 0.2, 2.5, 1.5, and 0.8 respectively. Size value 414 is the current number of non-zero entries in the row, and capacity value 416 is the maximum number of non-zero entries that can be stored in the nonZeros array 412. The capacity value 416 is programmable and may be set to values, such as, but not limited to: twice the estNNZs 408, the estNNZs 408, or an integer value. In an embodiment, a pointer is stored in an entry in the array 402 and the memory space is allocated only when the corresponding row in the matrix has at least one non-zero entry. In another embodiment, memory space is allocated for each row in the matrix when the array 402 is created.

The columns array 410 and nonZeros array 412 may be resized, and the capacity value 416 may be reset when the size value 414 becomes larger than the capacity value 416. This may occur when the actual distribution of the non-zero entries in the array is not uniform. There is a trade-off between time and space efficiency that may be taken into account when determining a size for the columns array 410 and the non-zeros array 412. Focusing only on minimizing allocation time (e.g., not having to resize columns array 410 and the nonZeros array 412) may result in wasted space while focusing only on minimizing memory space may result in more allocation time.

Embodiments utilize a balanced policy that takes into account both time and space considerations. In order to reduce allocation time, a policy that implements an aggressive allocation of space may be utilized before the capacity value 416 reaches the estNNZs 408, and in order to reduce wasted space, a policy that implements a conservative allocation of space may be utilized after the capacity value 416 reaches the estNNZs 408.

For an example allocation policy, assume that a matrix has m rows, n columns, and a sparsity of p. The maxNNZs 406 may be set to n and the estNNZs 408 may be set to round(n*p) (i.e, n times p rounded up to the nearest integer) for each sparse row. The initial capacity value 416 may be set to a constant integer number. When the size value 414 exceeds the capacity value 416, the columns array 410 and the nonZeros array 412 are re-allocated in the following manner. If the current capacity value 416 is less than the estNNZs 408, then the new capacity value 416 is set to the lower of: (1) the estNNZs 408; and (2) the current capacity value 416 multiplied by a first constant value (e.g., 2, 1.5). If the current capacity value 416 is not less than the estNNZs 408, then the new capacity value 416 is set to the lower of: (1) the maxNNZs 406; and (2) the current capacity value 416 multiplied by a second constant value (e.g., 1.1, 1.3). In an embodiment, the second constant value is less than the first constant value. Under this example allocation policy, the capacity value 416 grows at a faster rate (as determined by the first constant value) until it reaches the estNNZs 408 when it grows at a slower rate (as determined by the second constant value).

Figure 5:
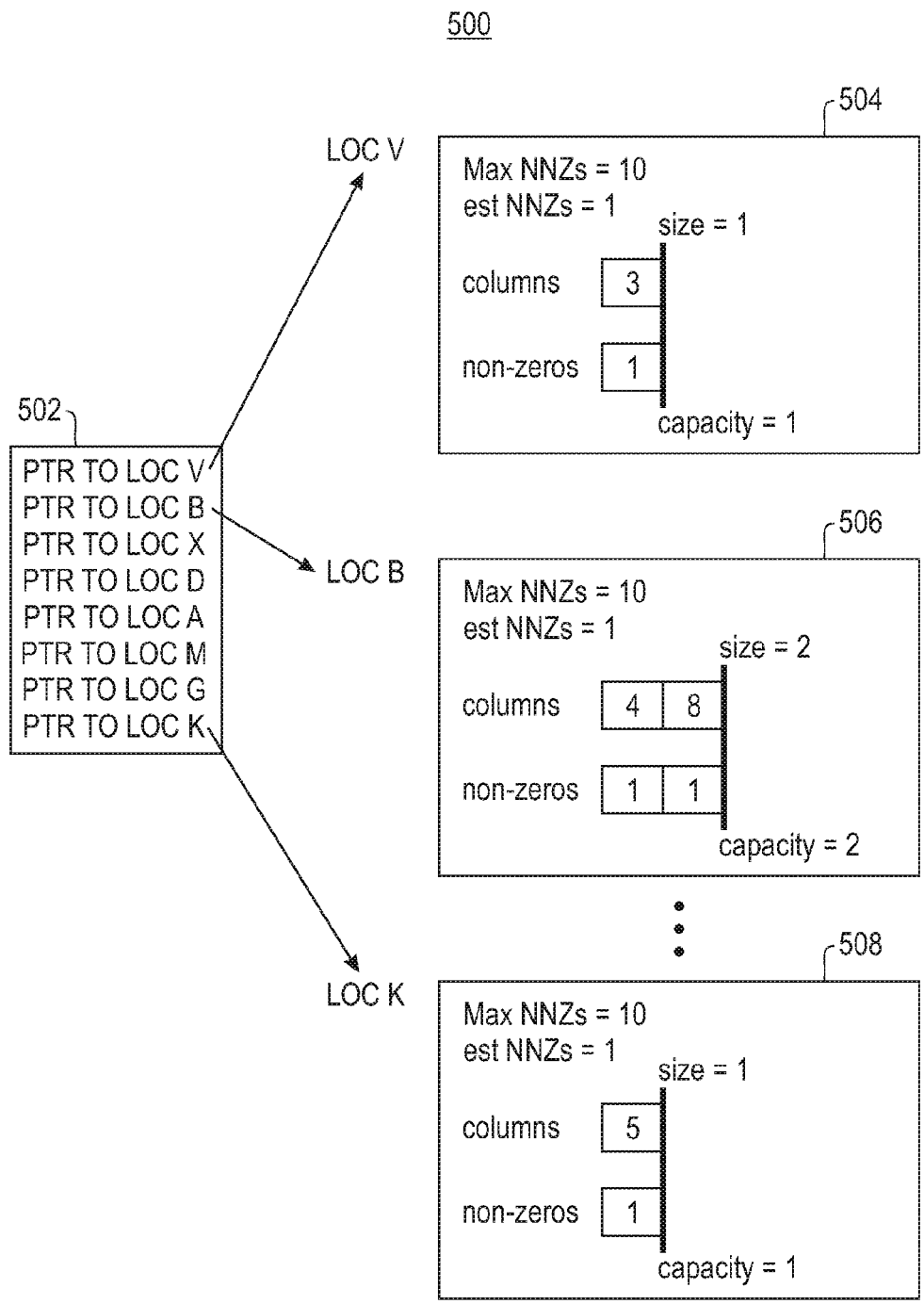
FIG. 5 illustrates a data structure for storing a sparse matrix in accordance with an embodiment.

Turning now to FIG. 5, an array of sparse rows data structure 500 is generally shown in accordance with an embodiment. The matrix stored in the sparse rows data structure 500 of FIG. 5 is matrix A 202. The array of sparse rows data structure 500 includes an array 502 that includes an entry for each of the eight rows in matrix A and a resizable sparse row memory location for each of the rows in the matrix. For illustrative purposes, contents of three of the eight sparse row memory locations 504 506 508 are shown in FIG. 5. Entries in the array 502 include pointers to the sparse row memory locations, including sparse row memory locations 504 506 508. Sparse row memory location 504 corresponds to the first row of matrix A 202, sparse row memory location 506 corresponds to the second row of matrix A 202, and sparse row memory location 508 corresponds to the eighth row of matrix A 202.

Both FIG. 4 and FIG. 5 illustrate an array of sparse rows data structure. An array of sparse columns data structure which may be used, for example, when the number of rows in a matrix is larger than the number of column, is similar and thus, not shown herein. Similar to the array of sparse rows data structure, an array of sparse columns data structure may include an array that includes an entry for each column in a matrix and a resizable sparse column memory location for each of the columns in the matrix. Entries in the array may include pointers to the sparse column memory locations. Each sparse column memory location may include a maximum number of non-zeros (maxNNZs), an estimated number of non-zeros (estNNZs), a rows array, a nonZeros array, a size value, and a capacity value. Allocation policy considerations that take into account tradeoffs between allocation time and space are also similar to those discussed previously with respect to an array of sparse columns data structure.

Figure 6:
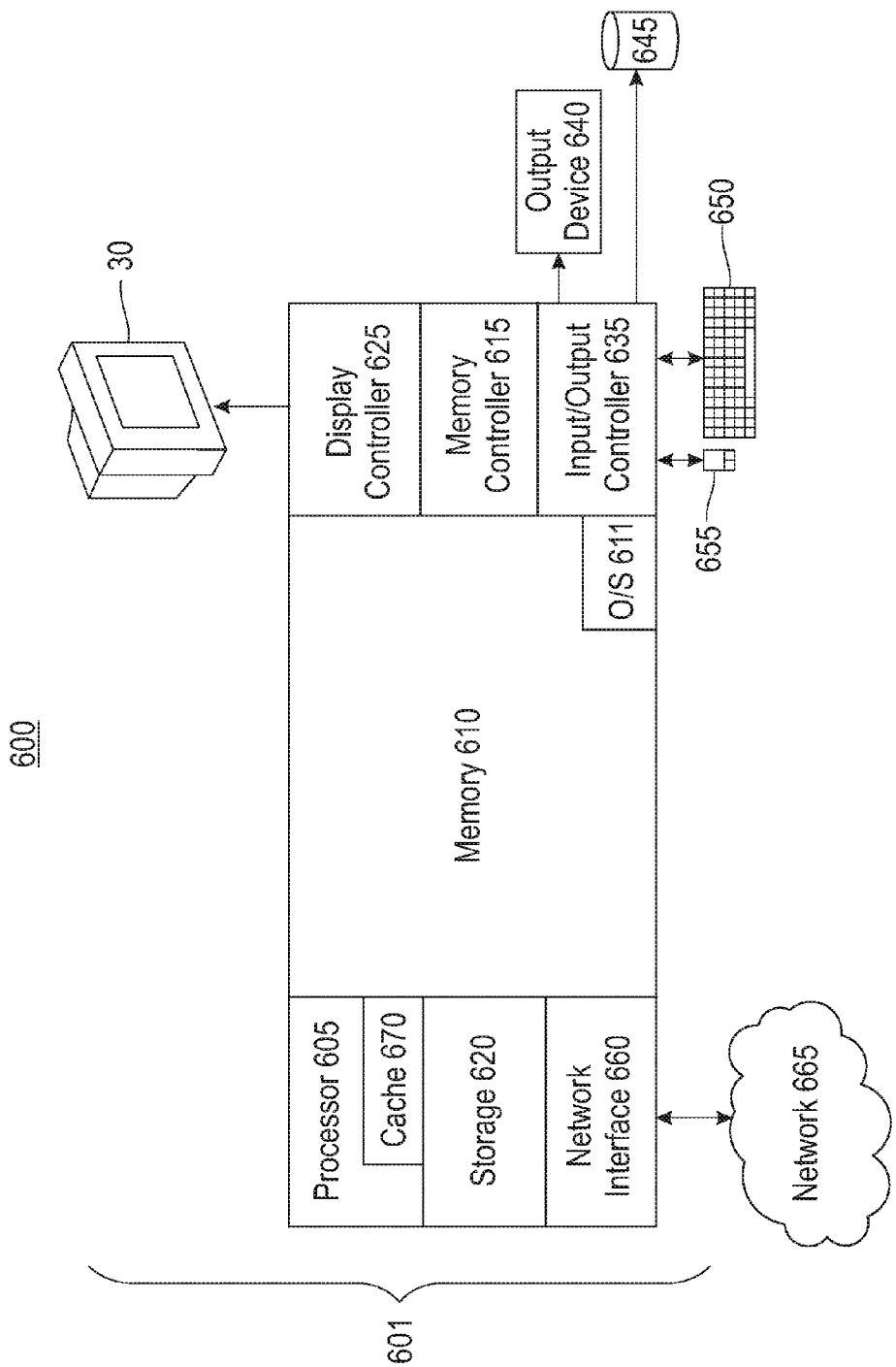
FIG. 6 illustrates a block diagram of a computer system for use in practicing the teachings herein.

FIG. 6 illustrates a block diagram of a computer system 600 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 600 therefore includes general-purpose computer 601.

In an exemplary embodiment, in terms of hardware architecture, as shown in FIG. 6, the computer 601 includes a processor 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 605 is a hardware device for executing hardware instructions or software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially controls the execution of other computer programs and provides scheduling, input-output control, file and data management, memory management, and communication control and related services. The matrices described herein may be stored in the memory 610.

In an exemplary embodiment, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630. In an exemplary embodiment, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential routines that initialize and test hardware at startup, start the OS 611, and support the transfer of data among the hardware devices. The BIOS is stored in ROM so that the BIOS can be executed when the computer 601 is activated. When the computer 601 is in operation, the processor 605 is configured to execute instructions stored within the memory 610, to communicate data to and from the memory 610, and to generally control operations of the computer 601 pursuant to the instructions.

Technical effects and benefits include the ability to store a matrix in a data structure that is selected based on the actual or estimated sparsity of the matrix. This may lead to better space utilization and better performance of matrix operations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of sparsity-driven matrix representation, the method comprising configuring a processor to perform operations including:
    determining a sparsity of a matrix that is a result matrix from a planned operation on at least one input matrix, wherein the determining includes estimating the sparsity of the matrix based on an estimated sparsity of the at least one input matrix and a type of the planned operation;
    comparing the sparsity to a threshold;
    allocating a computer memory to store the matrix in a first data structure format based on the sparsity being greater than the threshold, wherein the first data structure is one of a row-wise order dense one-dimensional (1D) array, a column-wise order 1D array, and a two-dimensional (2D) array;
    allocating the computer memory to store the matrix in a second data structure format based on the sparsity being less than or equal to the threshold;
    storing the matrix in the memory in the first data structure format based on the sparsity being greater than the threshold; and
    storing the matrix in the second data structure format based on the sparsity not being greater than the threshold.

* * * * *